United States Patent [11] 3,616,215

[72] Inventors Hiroshi Sasaki
Kanagawa-ken;
Akira Kamimura, Kanagawa-ken;
Kazuhiko Yamada, Kanagawa-ken; Teruo Shiro, Kanagawa-ken; Shinji Okumura, Tokyo, all of Japan
[21] Appl. No. 874,067
[22] Filed Nov. 4, 1969
[45] Patented Oct. 26, 1971
[73] Assignee Ajinomoto Co., Inc.
Tokyo, Japan
[32] Priority Nov. 9, 1966
[33] Japan
[31] 41/73692
Continuation-in-part of application Ser. No. 680,329, Nov. 3, 1967, now abandoned.

[54] METHOD OF PRODUCING INOSINIC ACID
4 Claims, No Drawings
[52] U.S. Cl...................................................... 195/28 N
[51] Int. Cl...................................................... C12d 13/06
[50] Field of Search........................................... 195/28 N

[56] References Cited
UNITED STATES PATENTS
3,232,844 2/1966 Kinoshita et al.............. 195/28 N
3,410,753 11/1968 Demain et al................. 195/28 N Primary Examiner—Alvin E. Tanenholtz
Attorney—Kelman and Berman ABSTRACT: Substantial amounts of 5'inosinic acid are formed from adenine when a conventional culture medium containing a source of phosphate ions and adenine is fermented by means of the newly discovered species Arthrobacter nucleogenes.

METHOD OF PRODUCING INOSINIC ACID

This application is a continuation-in-part of the copending application Ser. No. 680,329, filed on Nov. 3, 1967, and now abandoned.

This invention relates to the fermentative production of 5'-inosinic acid which is a known seasoning agent.

We have found a new species of micro-organisms, *Arthrobacter nucleogenes* T-348, which produces economically significant amounts of 5'-inosinic acid from adenine when cultured on largely conventional media containing adenine.

It has the following characteristics:

1. Microscopic Observation
    Rods, 0.4 to 0.6 by 2.0 to 6.0 microns. The rods undergo fragmentation, usually within 24 hours to give rise to coccoid forms of 0.4 to 0.6 by 0.6 to 0.8 microns. Pleomorphic feebly motile gram-positive, negative cells are found in old cultures. Spore not formed.
2. Nutrient agar colonies
    Circular, entire, raised, smooth, glistening, opaque, butyrous, light olive gray to lemon yellow growth after 1 week.
3. Nutrient agar slant
    Moderate, filliform, light olive gray to lemon yellow growth after 1 week.
4. Gelatin slab
    Liquefaction (7 days).
5. Milk
    Pale pink growth, slightly liquefaction (30 days).
6. B.C.P. milk
    Alkaline (30 days).
7. Indol
    Not produced (7 days).
8. Starch
    Hydrolyzed (7 days).
9. $H_2S$ (cystein added)
    produced (7 days).
10. Acid
    Not produced from glycerol, xylose, arabinose, glucose, fructose, saccharose, maltose, lactose and starch.
11. Methyl red test
    Negative
12. Acetyl methyl carbinol
    Not produced
13. Urease
    Negative (7 days).
14. Catalase
    Positive
15. Temperature relations
    Optimum, between 25° and 30° C. Minimum, at 10° and 37° C. No growth at 42° C.
16. pH relations
    No growth at pH 5.0, growth between pH 6.0 and 9.5
17. Nitrate reduction
    Positive.
18. Habitat
    Red pepper.

*Arthrobacter nucleogenes* T-348 is similar to *Arthrobacter citreus*, as described in Bergey's Manual of Determinative Bacteriology, 7th edition, but differs from *arthrobacter citreus* in the ability to hydrolyze starch and to produce hydrogen sulfide. It is, therefore, considered a new species.

A specimen culture of the newly discovered species has been deposited in and is available without restriction from the American Type Culture Collection in Rockville, Md.

The new species is employed for the fermentation of culture media which contain sources of assimilable carbon, nitrogen and phosphate, and adenine together with the organic and inorganic nutrients normally required for bacterial growth.

Suitable carbon sources include glucose, sucrose, starch, starch hydrolyzate, molasses, xylose, and arabinose and should be present in amounts of 5-15 g./dl. Nitrogen sources which have been employed successfully include ammonium chloride, ammonium nitrate, ammonium phosphate, and organic materials, such as yeast extract, dry yeast, soybean hydrolyzate, corn steep liquor, and polypeptone.

The necessary phosphate ions may be provided in the form of primary or secondary potassium or sodium phosphate, or secondary ammonium phosphate. The amount of available phosphate ions should be greater than the minimum necessary for bacterial growth, and preferably between 0.5 and 2.0 g./dl. Inorganic ions such as ferrous, magnesium, and manganese ions also should be present, the magnesium concentration in the medium being preferably between 0.06 and 0.2 g./dl.

The adenine concentration in the nutrient medium must be between 0.1 and 1 g./dl, and preferably is 0.2 to 0.5 g./dl. The adenine may be supplied initially, or added in several portions to the fermentation mixture.

The pH of the medium should be kept between 6.5 and 8.5. Calcium carbonate, ammonia, urea, or alkali metal hydroxides may be used for neutralizing the acid formed during fermentation. The fermentation is carried out under aerobic conditions at temperatures between 25° and 37° C., and can normally be terminated after 2 to 7 days.

The formation of 5'-inosinic acid in the fermentation broth can be measured by chromatographic and other known methods, and the acid can be recovered from the fermentation mixture by adsorption on activated charcoal or on ion exchange resins, or by solvent extraction.

The following example further illustrates the invention, but it should be understood that the invention is not limited thereto.

A seed culture of *Arthrobacter nucleogenes* T-348 was prepared on a nutrient medium arranged on a slant and containing 1 g./dl, yeast extract, 1 g./dl. polypeptone, 0.5 g./dl. sodium chloride and 2 g./dl. agar-agar, at pH 7.0 and at 30° C. within 1 day.

Twenty ml. batches of a culture medium containing 10 g./dl. glucose, 1 g./dl. potassium dihydrogen phosphate, 0.6 g./dl. ammonium sulfate, 0.6 g./dl. magnesium nitrate hexahydrate, 1 g./dl. yeast extract and 0.2 g./dl. adenine were placed in 500 ml. shaking flasks and the pH of the media was adjusted to 7.5 with potassium hydroxide. The media were sterilized at 110° C. for 10 minutes, and 0.4 g./dl. sterile calcium carbonate was added to each batch which was then inoculated with a loopful of *Arthrobacter nucleogenes* T-348 from the seed culture.

The fermentation was carried out at 31° C. for 3 days with shaking, whereafter the broth contained 6.8 g./dl. 5'-inosinic acid (calculated as disodium salt).

Nine hundred and fifty ml. of the broth were adjusted to pH 9.0 with sodium hydroxide, diluted with water to 10 times the initial volume and the solution was passed through a column packed with 200 ml. of a strong anion exchange resin (Duolite 102D) in the chloride form obtained by treatment with aqueous sodium chloride solution and then with hydrochloric acid. The column was washed with 500 ml. water, and was then eluted with a mixture of 750 ml. 0.2N-HCl and 170 ml. water at a rate of 6.5 ml. per minute. The 500 ml. fraction of the eluate containing 5'-inosinic acid was collected, adjusted to pH 7.5, and evaporated to 50 ml. in a vacuum. Sodium chloride precipitated from the concentrate and was removed by filtration. The filtrate was mixed with an equal volume of ethanol, and the mixture was kept overnight at 5° C. The inosinic acid was thereby recovered from the medium in the form of crude crystalline disodium 5'-inosinate obtained in an amount of 5.7 g.

What we claim is:

1. A method of producing 5'-inosinic acid which comprises culturing a 5'-inosinic acid producing bacterium belonging to the species *Arthrobacter nucleogenes* on an aqueous nutrient medium containing a carbon source, a nitrogen source, an organic nutrient, essential inorganic ions and adenine under aerobic conditions until inosinic acid is formed in said medium, and recovering the inosinic acid from the medium.

2. A method as set forth in claim 1, wherein said bacterium is *Arthrobacter nucleogenes* T-348 (ATCC 21279).

3. A method as set forth in claim 1, wherein said adenine is present in said medium in an amount of 0.2 to 1.0 g./dl.

4. A method as set forth in claim 1, wherein said inorganic ions include between 0.5 and 2.0 g./dl. of phosphate ions.